United States Patent [19]

Fracalossi et al.

[11] 4,438,220

[45] * Mar. 20, 1984

[54] POLYURETHANE FOAM-FILLED FOAM RESISTANT TO COMBUSTION AND METHOD OF PRODUCING SAME

[75] Inventors: Roland N. Fracalossi; Walter V. V. Greenhouse; Michael S. Buchanan, all of Baltimore, Md.

[73] Assignee: Wm. T. Burnett & Co., Inc., Baltimore, Md.

[*] Notice: The portion of the term of this patent subsequent to May 24, 2000 has been disclaimed.

[21] Appl. No.: 409,030

[22] Filed: Aug. 18, 1982

Related U.S. Application Data

[63] Continuation-in-part of Ser. No. 274,726, Jun. 18, 1981, Pat. No. 4,385,131.

[51] Int. Cl.$^3$ .................................................. C08G 18/14
[52] U.S. Cl. .................................. 521/55; 521/107; 521/114; 521/123; 521/137
[58] Field of Search ............... 521/55, 107, 114, 123, 521/137

[56] References Cited

U.S. PATENT DOCUMENTS

| | | | |
|---|---|---|---|
| 3,717,597 | 2/1973 | Hesskamp et al. | 521/128 |
| 3,897,372 | 7/1975 | Kehn et al. | 521/903 |
| 4,054,706 | 10/1977 | Shapiro | 428/213 |
| 4,385,131 | 5/1983 | Fracolossi et al. | 521/55 |

*Primary Examiner*—Maurice J. Welsh
*Attorney, Agent, or Firm*—A. W. Breiner

[57] ABSTRACT

Polyurethane foam products comprising a foam filled with a foam and a large amount of combustion retardant materials are described. The foams are prepared by foaming a polyurethane foam-forming diisocyanate and polyol around pre-formed polyurethane foam chips having incorporated therein solid combustion retardant materials. The polyurethane foam-filled foams have excellent physical characteristics and, because of their combustion properties, are particularly suitable for furniture upholstery and cushioning applications including in mattresses.

9 Claims, No Drawings

POLYURETHANE FOAM-FILLED FOAM RESISTANT TO COMBUSTION AND METHOD OF PRODUCING SAME

This application is a continuation-in-part of U.S. application Ser. No. 274,726 filed June 18, 1981, now U.S. Pat. No. 4,385,131.

This invention relates to polyurethane foams. More particularly, this invention relates to polyurethane foam-filled foams having controlled density, strength, and resiliency characteristics which are highly resistant to combustion caused by various sources.

The usage of polyurethane foams as a cushioning or padding material has greatly increased in the last ten to twenty years, primarily due to the excellent physical properties of polyurethane foams. Polyurethane foams are available having soft and resilient characteristics rendering them useful, for example, in pillows and blankets. Other polyurethane foams have moderate load-bearing characteristics and as a result are widely used, for example, as seatings in furniture and as fillings for mattresses. Still other polyurethane foam compositions are relatively firm and find application in men's and women's apparel, packaging, thermal and acoustical insulation, and carpet underlay. The versatility and quality of the products that can be manufactured from polyurethane foam are related to the advances that have been made in the chemistry of polyurethane raw materials and in the technology that has evolved in the formulation and processing of materials into satisfactory and needed products.

While the marketplace for polyurethane foams has witnessed innovations and improvements which have led to greatly expanded usage of polyurethane foams, there has been increasing concern that more needs to be done to reduce the fire potential of polyurethane foams. This concern with respect to fire is partly related to the increased effort which has been expended in recent years to reduce the number of injuries and fatalities to people that are caused by fires whatever the reason and source. Emphasis has been placed on a number of factors which directly influence the magnitude of fire problems, both in terms of human suffering and physical damage or loss of property. For example, educational programs in fire prevention are conducted widely; fire alert and fire protection systems have been improved. As a corollary to this concern, in recent years federal, state, and local regulations have been established intended to protect life and property from fire. These regulations often impose rigorous requirements in the specifications set for materials and products used by the consumer so as to make the materials and products safer for use. Many of these requirements take the form of test procedures designed to assess the fire potential of a particular material. In most cases the test procedure is small in scale, but some tests approach the dimension of a full-scale evaluation. In either case there is an effort to determine the fire potential of a material under controlled conditions.

The prior art of polyurethane foams establishes considerable activity with regard to reducing the fire potential of polyurethane foams. The use by the foam industry of chemical substances that are described as flame-retardant or combustability modifiers has increased substantially. Thus, it is known to produce polyurethane foams to meet a number of accepted standard tests which utilize small ignition sources. Examples of such tests include -

ASTM D 1692
Underwriters Labs UL94
Federal Motor Vehicle Safety Standard 302
State of California Technical Bulletin 117
Federal Aviation Administration Regulation No. 25.853.

These tests are widely used and specify, for example, that the foam specimen be exposed to the flame of a laboratory Bunsen burner. Additionally, the State of California Technical Bulletin 117 requires further testing using a lighted cigarette as the source of the ignition. It is significant that in many cases flexible foams have been produced commercially which meet the requirements of flammability standards based on small ignition sources. These foams can normally be made to have reasonably good physical characteristics (for example, tensile and tear strength, resiliency) since it is not necessary to modify them with major amounts of flame retarding substances in order to pass the flammability standards based on small ignition sources. The difficulty arises, however, with flexible polyurethane foam, i.e., a foam based on a polyisocyanate and a reactive polyol foamed with added water; when the requirements for resistance to flaming combustion are made significantly more rigorous. These requirements then necessitate the use of major amounts of flame-retarding substances. It has been found that the use of major amounts of flame-retarding substances either precludes the ability to formulate stable and suitable foam products, or else the products able to be made are often characterized by inferior physical characteristics (for example, low tensile and tear strength, poor resiliency).

Polyurethane foams are described in our copending application Ser. No. 274,726 filed June 18, 1981 which have relatively large amounts of solids, i.e., from 40 to 100 parts of urea or melamine, which have good physical characteristics. These foams were designed primarily to prevent fires starting under conditions of smoldering combustion. Such foams when subjected to a lighted cigarette dropped upon a foam covered with a Class I or Class II fabric as defined by the Upholstery Furniture Action Council (UFAC) will be extinguished without bursting into flame. Although the aforesaid foams have excellent resistance to smoldering combustion, there is still a need to produce polyurethane foam products having superior resistance to flaming combustion while still preserving the essential physical characteristics associated with polyurethane foams and which will withstand the more rigid tests now being required in the industry, including full-scale tests.

Accordingly, it is an object of this invention to produce polyurethane foam products having superior resistance to flaming combustion while still preserving superior physical characteristics that permit the foam to be used in numerous cushioning applications without fear of poor performance or rapid attrition.

It is also an object of this invention to produce polyurethane foam products by a method which optimizes the performances of major amounts of flame-retarding substances incorporated into the foam to resist flaming combustion of products made therefrom.

The aforesaid objects and others are realized by admixing major amounts of solid flame-retarding substances with shredded or ground polyurethane foam, and the admixture incorporated into a new flexible polyurethane foam comprising the reaction product of a polyisocyanate and a reactive polyol foamed with added water. The pre-formed foam particles and solid flame retardants are adhesively bonded into dimensionally stable molded configurations. The polyurethane foam obtained which is essentially a foam-filled foam, in addition to meeting the flammability standards of tests that specify small ignition sources, meets the requirements specified in larger-scaled, more sophisticated tests that may approach the complexity of a real fire situation. These latter type tests are often found where it is necessary to assure protection under conditions of high risk to persons and property. Examples include in jails, prisons, nursing and other institutional homes, rapid transit systems, hotels, buses, military vehicles, and the like, where flexible polyurethane foam may be installed as cushioning in comfort seating of all types and in mattresses.

One such test is the ASTM E-162 Radiant Panel Test in which small panels of foam are simultaneously exposed to a large pilot flame and a radiant heat source supplied from a 12"×18" radiant panel wherein gas and air are mixed and burned to yield radiating temperatures up to 1500° F. Other tests are often specified in the form of full-scale furniture and mattress constructions using particular fabrics and/or mattress tickings. In one such test the fuel source may be a wastepaper container filled with flammable paper-made products or a large grocery bag filled with several sheets of crumpled newspaper. The fuel source may be placed beneath the seating or mattress or, alternatively in the case of a chair, placed between the seat and back of the furniture. It has been found that foam material that passes the various standards specifying a small ignition source will perform poorly in these more rigorous tests.

According to the present invention, flexible polyurethane foams having a high level of solid materials incorporated therein can be provided which are resistant to rigorous conditions of flaming combustion and still have the essential physical characteristics of strength and durability. In contrast, foams have been made on conventional foam-forming equipment by combining all the needed components, including major amounts of flame-retarding substances, at one time so as to make large continuous slabs of foam. Under these conditions the polyurethane foam is formed and cured in the presence of the flame-retarding substances. While this practice is widely used to produce polyurethane foams containing relatively minor amounts of flame-retarding substances, recent technology has shown that, in a similar way, major amounts of flame-retarding substances may be blended into the foam-forming composition. In this manner the flame-retarding substances are uniformly dispersed and distributed evenly throughout the mass of the foam material as it is being formed. In essence, the foam so produced contains one or more fillers (the flame-retarding substances) which forms a homogeneous mix with the foam-forming components. While such uniformity of mix contributes to generally good foam appearance, it has been found that the higher concentrations of solid flame-retarding substances tend to have a significant deleterious effect on the strength and durability of the compounded foam material. This is the result of what may be described as a "dilution" in the polymer network of the normal physical characteristics of an unmodified (or unfilled) polyurethane foam material. The additions of the major amounts of flame-retarding substances in this way can reduce, for example, the tear strength of the foam by as much as 70 percent, and the elongation of the foam also by as much as 70 percent.

According to the present invention, however, wherein major amounts of solid flame-retarding substances are admixed with shredded or ground polyurethane foam, and the admixture foamed into dimensionally stable molded configurations, unexpectedly the tear strength of the molded foam is very similar to the tear strength of the original polyurethane foam which is shredded or ground into discrete particles for subsequent bonding into molded configurations. It is believed that the reason for this is that the flame-retarding substances are added to cured polyurethane foam chips in a completely separate operation. In this manner the original foam in the form of chips are essentially "coated" with the flame-retarding substances and, hence, retain their physical characteristics. While it can be observed that a portion of the flame-retarding substances penetrate into the foam to some extent, the major volume of the foam chip remains in its original condition prior to shredding or grinding. The new foam which acts as an adhesive binder, when added to the foam chips which have firstly been coated with the flame-retarding substances, functions to wet and adhere both to the surface of the foam chips and to the particles of flame-retarding substances so that upon subsequent addition of the mix to a mold, followed by suitable compression and foaming of the foam-forming reaction mixture with heat and/or steam, a molded configuration is obtained that is permanently formed into a uniquely foamed, stable structure which is essentially a foam-in-foam or a foam-filled foam. In this manner major amounts of flame-retarding substances can be incorporated into a polyurethane foam structure so that their presence has the least effect on the foam's inherently good and useful physical properties. This is possible since the flame-retarding substances are incorporated in a particular and controlled way.

It has also been discovered that by adding major amounts of flame-retarding substances to ground or shredded polyurethane foam and re-foaming in the manner hereinbefore described it is possible to influence significantly the resistance of the foam to flaming combustion. Thus, the bonded foam material of this invention, containing given amounts of flame-retarding substances, will perform better in the radiant panel test than will a similar non-bonded, virgin foam containing an equivalent amount of the flame-retarding substances. This was also an unexpected result. It is believed that the reason for this result is related to the uniquely bonded structure of this invention. Since the flame-retarding substances are concentrated essentially on the surfaces of the foam chips, they may act as an effective barrier to the transmission of heat from a flame front to the foam particles; whereas with non-bonded, virgin foam the flame-retarding substances are distributed fully and uniformly throughout the foam material which, in effect, reduces significantly the concentration of flame retardant available to form a barrier as effective as that formed in the bonded foam of this invention. Accordingly, the structure and characteristics of the polyurethane foam of this invention containing major amounts of flame-retarding substances permits the production not only of a foam material which retains its excellent physical properties, but also superior resistance to flaming combustion compared to conventionally produced, highly filled flame retardant foam compositions.

In practicing the invention, the following known flame-retarding substances are especially suitable when used in combination with shredded or ground polyurethane foam. It is possible to use relatively large amounts of solid flame retardant substances in accordance with the method of this invention without deteriorating the physical properties of the obtained structures, whereby less restriction is placed on the quantities of flame-retarding substances which can be used. In the case where polyurethane foam is basically "filled" with these substances, greater limitations are imposed to prevent deterioration of the foam material.

The preferred combination of flame-retarding substances for use according to this invention are solid substances in the form of finely-sized particles such as hydrated alumina, also described as aluminum trihydrate ($Al_2O_3.3H_2O$ or $AL(OH)_3$), decabromodiphenyl oxide, and antimony trioxide, in combination with liquid substances such as tetrakis (2-chloroethyl) ethylene diphosphate (commercially available as Thermolin 101), and tetrakis (2-chloroethyl) dichloroneopentyl diphosphate (commercially available as Phosgard 2XC20). It has been found especially advantageous to add in combination with the above-mentioned substances ethylene-maleic anhydride copolymer, commercially available from the Monsanto Company as EMA 31, which functions to assist in the formation of a charry residue during the exposure of the foam material to flaming conditions. The ethylene-maleic anhydride copolymer is a linear copolymer having the chemical formulation-

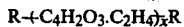

wherein R is the moiety of ethylene and maleic anhydride, the compound is a fine, white, free-flowing powder having a softening point of 170° C., a decomposition temperature of 247° C., specific viscosity in DMF of 0.9–1.2, and a pH (1% solution) of 2.3.

These known and useful flame-retarding substances have heretofore been used to produce "filled" flexible polyurethane foam from various polyether polyols by charging them along with the polyol into a mixing tank in successive steps to produce a blend that is reacted in a one-step process with toluene diisocyanate to produce slabs of foamed material in a continuous fashion on an endless conveyor. While these flame-retarding substances have been used as fillers in the conventional class of polyether polyols derived from the addition of propylene oxide and/or propylene oxide and ethylene oxide blends to starting substances such as glycerine, it has been reported that they may be used with polyols described in the literature as PHD polyols, a relatively new class of materials.

The shredded or ground flexible polyurethane foam as well as the new foam reactive material used to bond the particles of foam and combustion retardant materials to form a foamed structure suitable for use according to the present invention are derived from reactive hydroxy-terminated polyester or polyether polyols which are reacted with organic polyisocyanates in the presence of suitable catalysts, surfactants, and blowing agents. To obtain a flexible foam it is necessary to blow with some water. Although most any flexible polyurethane foam which can be shredded into discrete particles or chips can be bonded with the new foam according to this invention, relative ratios of chips to the bonding foam and the amount of solid material in the foam is critical. Thus, in accordance with the present invention, the structure obtained will comprise for each 100 parts of pre-formed discrete polyurethane foam particles from 100 to 200 parts of solid combustion retarding material, with the chips and combustion retardant materials being bonded with from 30 to 75 parts of the "new" foam binder. The "new" foam being the flexible foam formed by reacting the reactive polyol with the polyisocyanate. Because of the manner in which the combustion retardant materials are admixed with the pre-formed foam particles and then refoamed, the physical characteristics of the foam can be carefully controlled to provide the physical characteristics essential for meeting applications in cushioning, upholstered furniture, and mattress applications.

Examples 1-3 will establish the unique characteristics of the foams obtained according to the presently disclosed invention in comparison with prior art foams. Example 1 demonstrates the improvement obtained in accordance with this invention. Example 2 provides a foam made in accordance with the conventional one-shot method of forming foams for purposes of comparison with Example 1. Example 3 demonstrates that while a foam may pass certain small ignition type tests, it will not pass the more stringent, recently devised tests.

EXAMPLE 1

Flexible polyether polyurethane foam made by the one-shot process to produce conventional cushioning material was shredded on commercially available grinding equipment to yield foam chips having particle sizes typically in the range of one-fourth to one-half inch in diameter. The foam did not contain flame-retarding substances. The foam chips were tumbled in a container equipped with rotating mixing paddles and, while tumbling, to each 100 parts by weight of the foam chips were added uniformly the following in parts by weight: 97.1 parts of alumina hydrate, 15.1 parts of decabromodiphenyl oxide, 5.5 parts of antimony trioxide, 3.5 parts of ethylene-maleic anhydride copolymer, EMA 31, and 20.7 parts of Thermolin 101. The flame retarding substances essentially coated the surfaces of the foam chips, with a minor amount of material penetrating to varying degrees below the surface area of the chips. While still tumbling, 40.5 parts by weight of a liquid polyurethane foam-forming reaction product, as a binder, was added in a uniform manner into the mixture of chips and flame-retarding substances, and the final blend was further tumbled until all liquid binder was well distributed and fully absorbed by the flame-retarding substances and by the pre-formed foam particles. The polyurethane foam binder utilized is the reaction product of a polyether polyol having a molecular weight in the range of about 3000 to 6500 with toluene diisocyanate in the presence of a catalyst, i.e., stannous octoate; a surfactant component, i.e., organo-silicone compounds; a tertiary amine catalyst, i.e., N-ethyl morpholine; and sufficient cellosolve acetate solvent to provide a sprayable mixture. Water as the foaming agent essential to obtain the flexible new foam binder is provided later in the process as will be apparent. The blended material was then placed into a mold and compressed so as to obtain a density of 5.6 lbs. per cubic foot. The blend was exposed to live steam for five minutes at low pressure (maximum 10 psig) in order to foam and bond the blend, after which the compressed pad of polyurethane foam was dried in a hot air oven. The molded polyurethane foam pad had good strength and resiliency. The particles of flame-retarding substances were tightly bound to the foam chips on visual inspection. Verification of the structural integrity of the foam was established after flexing the pad in a compression apparatus for 100,000 cycles.

The pad was tested for resistance to flame spread in the radiant panel test ASTM E-162-76 at a thickness of one inch and the four specimens tested gave an average flame spread index of 8.82. There was no observed flame front progression for any specimen and no material was released in the form of drippings, which signifies that the samples passed the test.

In addition to having good resistance to flaming combustion, the foam pad was tested for physical properties in accordance with ASTM test method D-1564. The tensile strength was 11 psi; the elongation 85 percent, and the tear resistance 2.6 lbs. The pad gave a 25 percent ILD of 40.5 lbs., and a 65 percent ILD of 154 lbs. The ratio of the load at 65 percent divided by the load at 25 percent, recognized in the furniture, mattress, and automotive seating industry as a support factor which is desired to be at least 2.0 and preferably greater than 2.0, is calculated to be 3.8 which is a significant improvement and establishes the usefulness of the product in such applications.

EXAMPLE 2

In this example a flexible polyurethane foam is made by the one-shot process in which the same flame-retarding substances illustrated in Example 1 are incorporated into the foam-forming composition as shown below such that, based on 93.3 parts of polyether polyol used to make the foam, the equivalent amounts of flame-retarding substances are employed in this Example 2 as are used in Example 1. The purpose of this example is to make a comparison between the effective use of flame-retarding substances when made in accordance with the method of Example 1 and the method of Example 2.

The 100 parts by weight of foam chips used in Example 1 are made from approximately 65.9 parts by weight of the polyether polyol and 34.1 parts by weight of toluene diisocyanate. The liquid polyurethane foam binder of Example 1, which is 40.5 parts by weight, is made from 27.4 parts by weight of polyether polyol and 13.1 parts by weight of toluene diisocyanate. Accordingly, the combined total of polyether polyol used in Example 1 is 93.3 parts by weight, and the toluene diisocyanate is 47.2 parts by weight. The foam-forming composition for this Example 2 is as follows:

93.3 parts polyether polyol (Pluracol 774 from BASF Wyandotte Corp.)
47.2 parts toluene diisocyanate
97.1 parts alumina hydrate
15.1 parts decabromodiphenyl oxide
5.5 parts antimony trioxide
3.5 parts ethylene-maleic anhydride copolymer EMA 31
20.7 parts Thermolin 101

The alumina hydrate, decabromodiphenyl oxide, antimony trioxide, ethylene-maleic anhydride copolymer, and Thermolin 101 are added to 93.3 parts of Pluracol 774 and mixed thoroughly in a Hobart mixer until a smooth, creamy, flowable consistency is obtained. The viscosity of the blend was tested with a Brookfield Viscometer and indicated approximately 10,000 centipoises. This blend was transferred through a Moyno pump to the mixing head of a conventional polyurethane foam-forming apparatus, together with 47.2 parts toluene diisocyanate and sufficient water, catalyst, and surfactant to produce a large slab of flexible polyurethane foam. The slab was allowed to reach its optimum exotherm for curing, and further permitted to set several days before any testing was done. Foam specimens were cut from the slab for testing in the radiant panel test ASTM E-162-76 at a thickness of one inch, and the four specimens tested gave an average flame spread index of 254. Two of the specimens burned to the 12" benchmark, and the other two burned to the 15" benchmark. No material was released in the form of drippings.

The foam was tested in accordance with ASTM D-1564, and had the following physical properties: tensile strength of 9.0 psi, elongation of 70 percent, and tear resistance of 1.15 lbs. The pad gave a 25 percent ILD of 38 lbs., and a 65 percent ILD of 76 lbs., providing a ratio of the load at 65 percent divided by the load at 25 percent of 2.0.

EXAMPLE 3

This example is to illustrate a flexible polyether urethane foam having incorporated into its foam-forming composition sufficient flame-retarding substances so that the foam will meet the flammability requirements of the Federal Aviation Administration Regulation No. 25.853 which applies to the compartment interiors of aircraft. This foam formulation is a conventional one-shot formulation using polyether polyol and toluene diisocyanate, mixed in the presence of water, catalyst, and surfactant; and having further incorporated into the foam-forming mixture about 16 parts by weight of Thermolin 101. The foam so produced in slab form is a resilient material satisfactory for comfort cushioning and can be used as a seat cushion in aircraft. The foam pad prepared by this Example 3 under the FAA test at one-half inch foam thickness gave an average burn length of four to five inches (not to exceed eight inches by FAA standards), an average flame time of four to six seconds after removal of the flame source (not to exceed fifteen seconds by FAA standards), and an average flaming dripping time of one to three seconds (not to exceed an average of five seconds after falling by FAA standards).

The foam was tested in accordance with the radiant panel test ASTM E-162-76 at a thickness of one inch, and the four specimens tested gave an average flame spread index of 562. All of the specimens burned to the 15" benchmark, and burning material was released in the form of drippings.

From the aforesaid examples it is clear that Example 1 made in accordance with the present invention provides a foam product with unexpectedly low values in the radiant panel test procedure herein described. These values are significantly ower than those obtained with the filled foam of Example 2. The foams made in accordance with this invention can be used as cushioning in numerous applications where in many instances the maximum allowed flame spread index is 25. Such applications include, as previsouly mentioned, in areas where high risk is involved (mattresses in jails and hotels; cushioning in seating in hotels, buses, and rapid transit vehicles, for example). Example 3 is included to show that tests utilizing small ignition sources, while giving some indication of the relative resistance to flaming combustion under conditions where the likelihood of exposure to flames or heat is restricted, are not satisfactory as a measure of what could happen under more gorous conditions of combustion.

In Example 1 and in accordance with the present invention, the solid combustion retardant additive can be present at from about 100 to 200 parts per 100 parts of polyurethane foam chips. Preferably the combustion retardant additive will be present at from about 100 to 130 parts per 100 parts of polyurethane foam chips. The liquid polyurethane foam binder as employed in Example 1 can be any of the known polyurethane foam formulations that can be cured to provide a flexible cellular foam material and is present in an amount sufficient to provide good bonding, and will be used in an amount of 30 to 75 parts per 100 parts of foam chips. The binder can be prepared from the required components and used immediately, or it can be stored in closed containers for later use. It is normally required that the binder be thinned with a suitable solvent, such as cellosolve acetate, so that it can be sprayed with equipment which employs either the airless or air-type principle.

While Example 1 as set forth hereinbefore illustrates the use of live steam at low pressure to expand and cure the new foam binder in combination with the compressed foam chips, other methods can also be utilized. One such method comprises adding water to the foam chips and mixing thoroughly prior to the addition of the liquid polyurethane foam binder. Thereafter, after all of the various components required for the composition have been added and the pad compressed to the desired density, warm air is then passed through the pad to expand, cure, and dry the bonded polyurethane foam.

Pluracol 774 employed in Example 2, is manufactured by BASF Wyandotte Corporation and is a polyether polyol having a molecular weight of about 3500 and produced by the reaction of a mixture of propylene oxide and ethylene oxide with glycerol.

While the polyurethane foam structures of this invention are well suited for use in cushioning for seating and mattresses, it has other uses in various resilient products where such applications require more combustion-resistant foam materials. These applications include textiles such as wearing apparel and blankets; thermal and acoustical insulation for home, industry, and transportation; packaging for military and industrial hardware; as well as carpet underlayment; air filters; athletic equipment; toys, and novelties—as examples only.

Various modifications to the invention as above described will be apparent to those skilled in the art.

We claim:

1. A combustion-retardant polyurethane foam structure obtained through the steps of (a) obtaining particles of flexible polyurethane foam; (b) admixing said particles of (a) with solid combustion-retardant material; (c) uniformly applying to said admixture of (b) a liquid flexible polyurethane foam-forming material containing a reactive polyol and a polyisocyanate; (d) foaming said foam-forming material (c) with water to provide a flexible foam having bonded therein said polyurethane foam particles and said solid combustion-retardant material; the relative amounts of materials in said foam structure being such that for each 100 parts by weight of polyurethane foam particles, about 100 to 200 parts by weight of said combustion-retardant material and about 30 to 75 parts by weight of said foam-forming material are used.

2. The structure of claim 1 wherein said particles of polyurethane foam are obtained as the reaction product of a polyether polyol and a polyisocyanate, foamed with water.

3. The structure of claim 2 wherein said liquid flexible polyurethane foam-forming material contains a reactive polyether polyol.

4. The structure of claim 1 wherein said particles of polyurethane foam are obtained as the reaction product of polyester polyol and a polyisocyanate, foamed with water.

5. The structure of claim 4 wherein said liquid flexible polyurethane foam-forming material contains a reactive polyester polyol.

6. The structure of claim 1 including uniformly contained therein a liquid combustion-retardant material in combination with said solid combustion-retardant material.

7. The structure of claim 6 wherein said combination of combustion-retardant materials comprises alumina hydrate, decabromodiphenyl oxide, anitmony trioxide, ethylene-maleic anhydride copolymer, and tetrakis (2-chloroethyl), ethylene diphosphate.

8. The method of forming a combustion-retardant polyurethane foam structure comprising the steps of (a) obtaining particles of flexible polyurethane foam; (b) admixing said particles of (a) with solid combustion-retardant material; (c) uniformly applying to said admixture of (b) a liquid flexible polyurethane foam-forming material containing a reactive polyol and polyisocyanate; (d) foaming said foam-forming material with water to provide a flexible foam having bonded therein said polyurethane foam particles and said solid combustion-retardant material; the relative amounts of materials in said foam structure being such that for each 100 parts by weight of polyurethane foam particles, about 100 to 200 parts by weight of said combustion-retardant material and about 30 to 75 parts by weight of said foam-forming material are used.

9. The method of claim 8 wherein said structure is formed by placing the reactive mixture obtained from steps (a), (b), and (c) in a mold and compressing to the desired density and thereafter exposing said mixture to live steam at low pressure to foam said foam-forming material.

* * * * *